(12) United States Patent
Dennerline et al.

(10) Patent No.: US 8,006,303 B1
(45) Date of Patent: Aug. 23, 2011

(54) SYSTEM, METHOD AND PROGRAM PRODUCT FOR INTRUSION PROTECTION OF A NETWORK

(75) Inventors: David Allen Dennerline, Sandy Springs, GA (US); Terry Lee Nelms, II, Dallas, GA (US); Bernard Paul Palmer, Jr., Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/759,427

(22) Filed: Jun. 7, 2007

(51) Int. Cl.
G06F 11/00 (2006.01)
G06F 12/14 (2006.01)
G06F 12/16 (2006.01)
G08B 23/00 (2006.01)

(52) U.S. Cl. ............................................. 726/23
(58) Field of Classification Search ............ 726/23
See application file for complete search history.

(56) References Cited

U.S. PATENT DOCUMENTS

| | | | |
|---|---|---|---|
| 6,324,647 B1 * | 11/2001 | Bowman-Amuah | 726/23 |
| 6,715,083 B1 * | 3/2004 | Tovander | 726/23 |
| 6,877,095 B1 * | 4/2005 | Allen | 713/182 |
| 7,089,428 B2 * | 8/2006 | Farley et al. | 726/22 |
| 7,305,708 B2 | 12/2007 | Norton et al. | |
| 7,418,733 B2 * | 8/2008 | Connary et al. | 726/25 |
| 7,526,806 B2 * | 4/2009 | Wiley et al. | 726/23 |
| 7,681,235 B2 * | 3/2010 | Chesla et al. | 726/23 |
| 2004/0093513 A1 * | 5/2004 | Cantrell et al. | 713/201 |
| 2005/0257269 A1 * | 11/2005 | Chari et al. | 726/25 |
| 2006/0037077 A1 | 2/2006 | Gadde et al. | |
| 2006/0075481 A1 | 4/2006 | Ross et al. | |
| 2006/0268866 A1 | 11/2006 | Lok | |
| 2007/0067841 A1 | 3/2007 | Yegneswaran et al. | |
| 2007/0150574 A1 | 6/2007 | Mallal et al. | |
| 2007/0237149 A1 * | 10/2007 | Milstein et al. | 370/392 |
| 2007/0286195 A1 | 12/2007 | Ilnickl et al. | |
| 2007/0297333 A1 | 12/2007 | Zuk et al. | |
| 2007/0297410 A1 | 12/2007 | Yoon et al. | |
| 2010/0125900 A1 * | 5/2010 | Dennerline et al. | 726/13 |

OTHER PUBLICATIONS

Li, S. et al; "Improving a Network Security System by Reconfigurable Hardware," IEEE Proceedings in Norchip Conference, pp. 135-138, Nov. 2004.
Search Report for PCT/EP2009/064195 dated Jul. 30, 2010.

* cited by examiner

Primary Examiner — Farid Homayounmehr
(74) Attorney, Agent, or Firm — Arthur J. Samodovitz

(57) ABSTRACT

Intrusion protection. A first packet en route to a first destination is received. A first value representing a benefit for analyzing the first packet for intrusions in relation to a cost for analyzing the first packet for intrusions is automatically determined. An automatic determination is made that the first value is sufficiently high to warrant an analysis of the first packet for intrusions, and in response, the first packet is analyzed for intrusions. If the analysis of the first packet for intrusions indicates an intrusion, the first packet is discarded without forwarding the first packet to the first destination. A second packet en route to a second destination is received. A second value representing a benefit for analyzing the second packet for intrusions in relation to a cost for analyzing the second packet for intrusions is automatically determined. An automatic determination is made that the second value is not sufficiently high to warrant analysis of the second packet for intrusions, and in response, the second packet is forwarded to a next hop en route to the second destination without analyzing the second packet for intrusions.

18 Claims, 2 Drawing Sheets

SYSTEM, METHOD AND PROGRAM PRODUCT FOR INTRUSION PROTECTION OF A NETWORK

FIELD OF THE INVENTION

The invention relates generally to network security, and more specifically to an intrusion protection system which monitors incoming packets and flows.

BACKGROUND OF THE INVENTION

A known Intrusion Prevention System ("IPS") with a SNORT™ intrusion analysis engine or Internet Security System PAM™ intrusion analysis engine can be interposed between network segments. For example, the IPS can be installed in a firewall or gateway to a network. The IPS can analyze incoming message packets for intrusions, such as viruses and worms ("malware"), attempted exploitation of vulnerabilities such as buffer overflows, violations of network policy, and/or denial of service attacks. If the IPS detects an intrusion in a packet, the IPS can automatically block/drop the packet, block the flow associated with the packet, and/or notify an administrator. The administrator can further analyze the notification details, and if he or she determines that the notification is associated with an intrusion, may change the configuration of a firewall to block the intruder, report the event to the authorities, gather forensic evidence, clean any compromised hosts, and/or contact the administrator of the network that was the source of the attack.

Occasionally, the rate of incoming packets is greater than the IPS can process them (i.e. analyze them for intrusions). In such a case, the IPS can either drop or pass the excess packets which it cannot process. If the packet is not malicious but is dropped (without analysis) due to the overload, this may represent a loss of important data, request or other communication. If the packet is malicious but is allowed to pass through the IPS (without analysis) due to overload, this may harm a device on the destination network. To mitigate the risk, there may be a firewall between the IPS and the destination network that will block some potentially malicious packets. The firewall will block the packet if the packet does not match a permitted flow, i.e. combination of source IP address, source port, destination IP address, destination port and protocol, but may not analyze the packet for viruses or worms or detect an attempted exploitation of vulnerabilities or denial of service attack. In any event, statistically the risk of loss of important data, request or other non malicious communication may outweigh the risk that the packet being passed without analysis is malicious and the harm it will cause. Nevertheless, further steps should be taken to better manage an intrusion prevention system.

An object of the present invention is to better manage an IPS.

Another object of the present invention is to better manage an IPS in case of an overload of incoming packets.

SUMMARY OF THE INVENTION

The present invention resides in a computer system, method and program for intrusion protection. A first packet en route to a first destination is received. A first value representing a benefit for analyzing the first packet for intrusions in relation to a cost for analyzing the first packet for intrusions is automatically determined. An automatic determination is made that the first value is sufficiently high to warrant an analysis of the first packet for intrusions, and in response, the first packet is analyzed for intrusions. If the analysis of the first packet for intrusions indicates an intrusion, the first packet is discarded without forwarding the first packet to the first destination. A second packet en route to a second destination is received. A second value representing a benefit for analyzing the second packet for intrusions in relation to a cost for analyzing the second packet for intrusions is automatically determined. An automatic determination is made that the second value is not sufficiently high to warrant analysis of the second packet for intrusions, and in response, the second packet is forwarded to a next hop en route to the second destination without analyzing the second packet for intrusions.

DETAILED DESCRIPTION OF THE PREFERRED EMBODIMENTS

Figure 1:
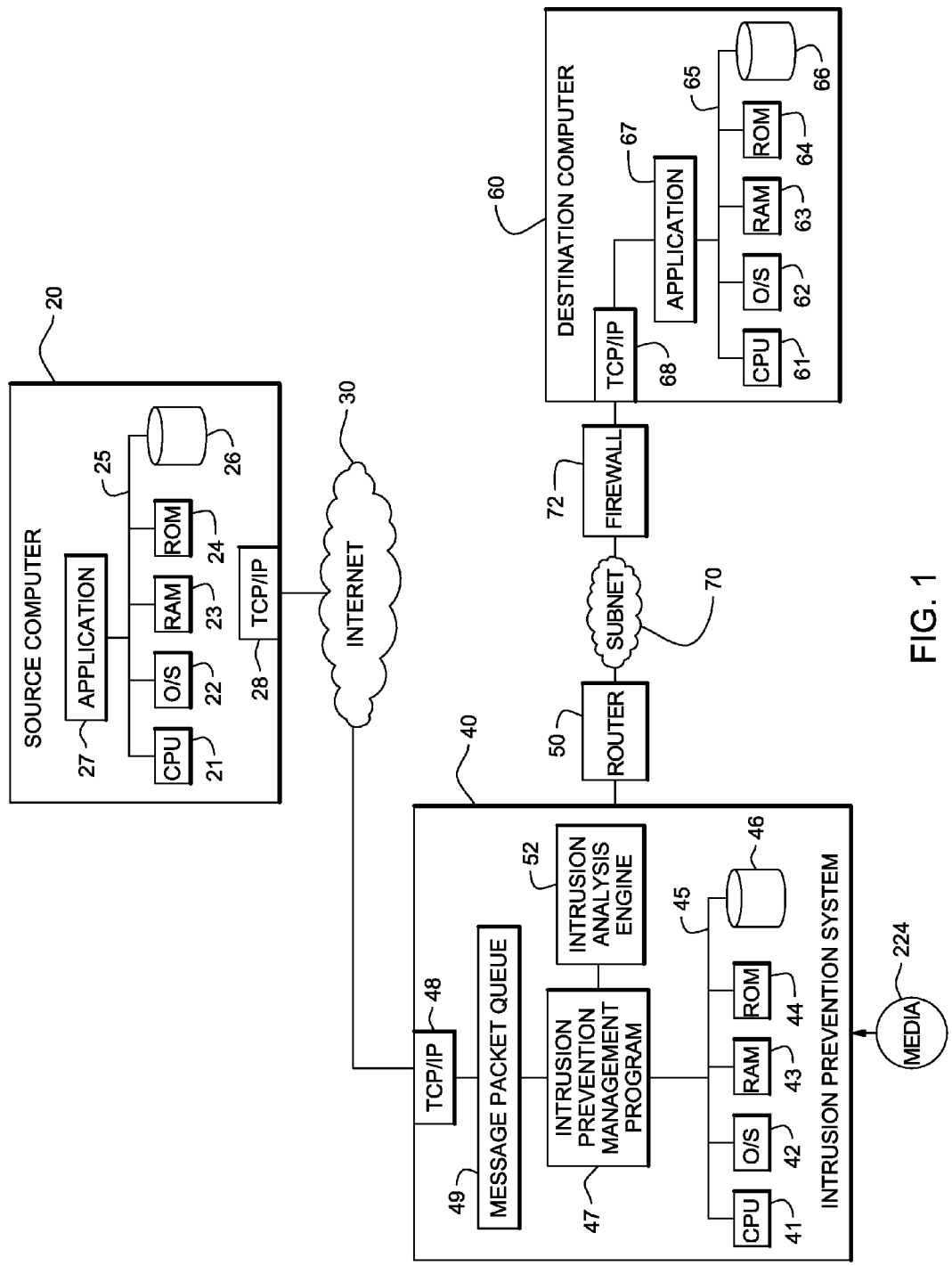
FIG. 1 is a block diagram of a distributed computer system including an intrusion prevention system according to the present invention.

The present invention will now be described in detail with reference to the figures. FIG. 1 illustrates a distributed computer system generally designated 10 in which the present invention is incorporated. A source computer 20 includes a known CPU 21, operating system 22, RAM 23 and ROM 24 on a bus 25, a storage 26 and TCP/IP adapter card 28 for Internet 30. Source computer 20 also includes a known application 27 which generates data, requests or other messages addressed to a destination subnet 70 or destination computer 60. Source computer 20 is coupled to subnet 70 via an untrusted network 30 (such as the Internet) and an intrusion prevention system ("IPS") 40, according to the present invention. IPS 40 can reside in a firewall or gateway device for subnet 70 or be interconnected "in-line" between the network 30 and a router 50 for a subnet 70 as shown in FIG. 1. Destination computer 60 includes a known CPU 61, operating system 62, RAM 63 and ROM 64 on a bus 65, a storage 66 and a TCP/IP adapter card 68. Destination computer 60 also includes a known application 67 which processes data, requests or other messages sent by source computer 20 (and other source devices not shown). Application 67 is stored in computer-readable disk storage device 66 for execution by CPU 61 via RAM 63.

IPS 40 includes a known CPU 41, operating system 42, RAM 43 and ROM 44 on a bus 45 and a storage 46. Source computer 40 also includes a known intrusion analysis engine 52 (implemented in software and/or hardware) which analyzes incoming packets to detect and block intrusions such as viruses, worms, or other packets which attempt to exploit a vulnerability in the destination computer or cause denial of service attacks. Intrusion analysis engine 52 can also block messages with unwanted content such as pornography and/or spam. A known SNORT intrusion analysis engine detects intrusions in packets based on signatures or other patterns of bits in each packet. A known Internet Security System PAM intrusion analysis engine detects intrusions in packets based on signatures and patterns, vulnerable host simulation, known malicious behavior, traffic anomalies, protocol anomalies and other types of exploits. PAM intrusion analysis engine determines and emulates the state of the application at both the requesting computer and the destination device, and determines if the current packet will exploit a known vulnerability in the destination computer. For example, if the destination device is a web/HTTP server and the TCP stream contains a URL that is longer than the URL buffer size of the web server, PAM intrusion analysis engine considers this to be an attempted exploit of the vulnerability by the requester because it will cause a buffer overflow in the web server. As another example, if the destination device is a web/HTTP server, the requester makes a request and the web server responds with an HTML web page with an excessively long tag, PAM intrusion analysis engine considers this to be attempted exploit of the vulnerability by the web server because it will cause a tag buffer overflow in the requester's web browser. PAM intrusion analysis engine also detects unusual network traffic presumed to be malicious such as a remote Microsoft Windows shell request, unauthorized attempts to access a root directory or SQL injection of SQL requests in data fields. PAM intrusion analysis engine also detects unusual or unnecessary encryption, obfuscation or other techniques to obscure intrusions. PAM intrusion analysis engine also detects traffic anomalies such as unusual network mapping including attempts to identify open ports with an unusual large number of connection requests.

IPS 40 also includes an intrusion prevention management function 47 (implemented in hardware and/or software) according to the present invention which determines a composite score for each incoming message packet based on various factors. The higher the composite score the greater the projected or likely benefit/cost ratio for analysis by the intrusion analysis engine 52. One potential benefit is detection of intrusions. The cost can be the time/burden to analyze the packet for intrusions. By way of example, the composite score is based on the following benefit and cost factors:

(a) Protocol type. If a protocol has more associated vulnerabilities or higher risk vulnerabilities, there will be greater likely benefit to analyzing a packet with such a protocol, and therefore a higher composite score. The weight of this factor is based on the number and severity of the known and likely vulnerabilities for each protocol.

(b) Customer preferences for analyzing certain types of packets addressed to specific destination devices that the customer may consider to be very important or sensitive. If the customer has indicated that specific destination devices are very important and/or sensitive, this will raise the composite score for a packet addressed to such a destination device because the benefit will be higher. The weight of this factor is based on the importance and/or sensitivity of the destination device.

(c) Whether IPS 40 or intrusion analysis engine 52 is able to analyze the packet. If not, then the composite score is lower.

(d) Whether the destination computer includes an intrusion analysis engine of its own. If so, the composite score will be lower because IPS 40 is partially or completely redundant, and the benefit is not so great for conducting the intrusion analysis in IPS 40. The weight of this factor is based on the effectiveness of the intrusion analysis engine at the destination computer, if any.

(e) Whether the packet contains a payload or is just an acknowledgment (without a payload). If there is no payload, then the composite score will be reduced because there is no application protocol contained in the packet and the benefit for conducting the intrusion analysis is low. For example, if the packet is a TCP acknowledgment packet but does not contain a payload, there is little chance that the packet is attempting to exploit a vulnerability in the destination device.

(f) Whether the packet is structured to hinder detection by the IPS. If so, the benefit of an intrusion analysis is increased because it is more likely that the packet is an intrusion.

(g) The byte count of the entire flow associated with the current packet. If the byte count for the flow is large, this will lower the composite score except for protocols and file types where the exploit may readily or likely occur later in the session.

(h) Whether the intrusion analysis engine 52 knows the current state of a state-based flow. If not, then program 47 will lower the composite score for the current packet on the flow because program 47 cannot effectively evaluate the current packet so there is lower benefit of an intrusion analysis.

The weight of each factor reflects the degree to which the factor effects the benefit/cost of conducting the intrusion analysis. The lower the composite score, the lower the benefit/cost ratio for completely analyzing the packet by intrusion analysis engine 52. If the composite score is below an applicable threshold for composite score, then function 47 will automatically pass the packet to the next hop en route to the destination computer without analysis by the intrusion analysis engine 52. However, if the composite score is greater than or equal to the applicable threshold for composite score, then program notifies intrusion analysis engine 52 to completely analyze the packet. If intrusion analysis engine 52 detects malicious behavior or otherwise determines a high risk associated with the packet, then intrusion analysis engine 52 will drop the packet. Otherwise, intrusion analysis engine 52 will notify function 47 that the packet is not malicious. In response, function 47 will forward the packet to router 50 to route according to a known routing algorithm to the next hop en route to the destination subnet 70 or destination computer 60. The determination of the composite score for each packet takes a much shorter time than would be required by intrusion analysis engine 52 to analyze the packet for intrusions. This allows a greater throughput for IPS 40 and alleviates overload of IPS 40.

In addition to determining the composite score for each packet, if intrusion analysis engine 52 finds a malicious packet on a flow, then function 47 will automatically block/discard all subsequently received packets on the same flow. This has a similar effect as assigning the highest composite score for such a packet, but does not require function 47 to compute the composite score.

Function 47 also dynamically adjusts the threshold for the composite score based on the rate of incoming packets compared to the rate that IPS 40 can process them. If the rate of incoming packets is greater than the rate at which IPS 40 (including function 47 and intrusion analysis engine 52) can process them, then function 47 will increase the threshold for composite score so that (statistically) more packets will pass through IPS 40 without a complete, time-consuming analysis by intrusion analysis engine 52. This will reduce the backlog in IPS 40 and allow IPS 40 to keep up with the rate of incoming packets. Conversely, if the rate of incoming packets is significantly lower than the rate at which IPS 40 (including function 47 and analysis engine 52) can process them, then function 47 will decrease the threshold for composite score so that (statistically) more packets will be analyzed by intrusion analysis engine 52. This will increase security without overloading IPS 40. Intrusion prevention management program 47 and intrusion analysis engine 52, when embodied in software, are stored in computer-readable disk storage device 46 for execution by CPU 41 via RAM 43.

Figure 2:
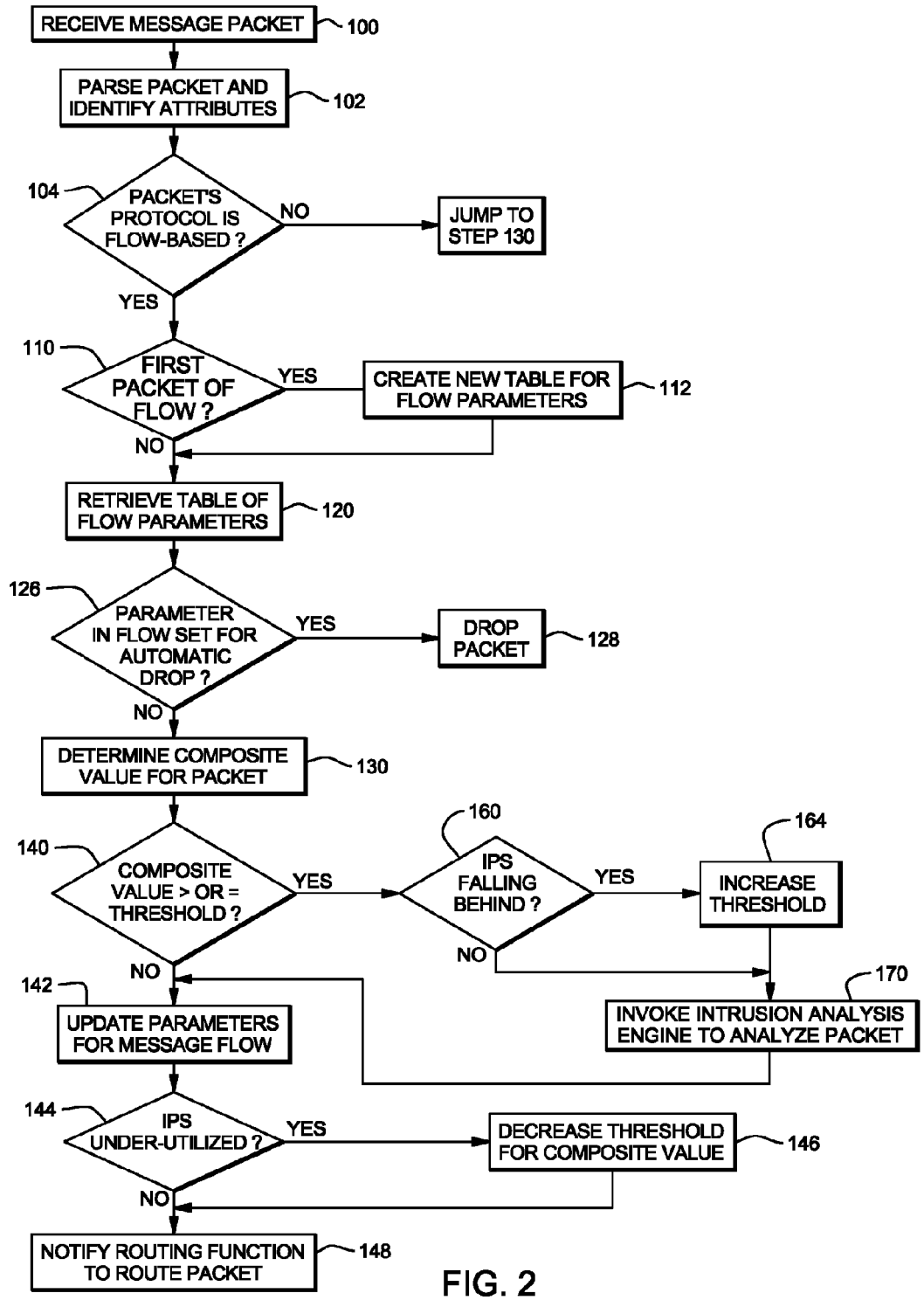
FIG. 2 is a flow chart of an intrusion prevention management function, within the Intrusion Prevention System of FIG. 1, according to the present invention.

FIG. 2 illustrates function and operation of intrusion prevention management function 47 and associated functions in more detail. In step 100, IPS 40 receives a packet and buffers the packet awaiting processing by function 47. In response, function 47 parses the packet and identifies attributes of the packet relevant to determining the composite score or whether the packet should automatically be dropped. These attributes comprise the specific OSI layer 3 protocol of the packet, the specific OSI layer 4 protocol of the packet, whether IP fragmentation field is set for TCP, whether the packet is merely an acknowledgment without a payload, whether the packet is encrypted, and the identity of the flow associated with the packet (step 102). Function 47 determines the layer 3 protocol based on the type field in the datalink protocol's header (e.g. the type field in the Ethernet header). Function 47 determines the application/layer 4 protocol based on the protocol field in the network protocol's header (e.g. IPv4's protocol field). The IP fragmentation field is located at a known location in the packet header based on the type of protocol. Function 47 determines whether the packet is merely an acknowledgment without a payload based on the total length of the packet specified in the IP header. The source IP address, source port, destination IP address, destination port, layer 4 protocol, and optionally the VLAN ID attributes identify the flow of which this packet is part. Function 47 performs step 102 without initiating intrusion analysis of the packet, i.e. without analyzing the packet for signatures or patterns of intrusion, or other characteristics of an attempted exploit or denial of service attack, such as provided by ISS PAM intrusion analysis engine as described above.

Next, function 47 determines if this packet has a flow-based protocol, i.e. a protocol which involves a two-directional communication (decision 104). Typically, a two-directional communication includes a setup of the communication, a request, a response and a closure of the communication. Examples of flow-based protocols are TCP, UDP (when the application layer is flow based) and SCTP. (Other protocols such as ARP and ICMPv6 are not flow-based, and are typically used for broadcast and/or one-way communications such as address resolution or error reporting.) As described in more detail below, for flow-based protocols, function 47 determines the composite score for packets in the same flow (or whether to automatically drop subsequently received packets in the same flow) based in part on other, previously received packets in the same flow. If the packet is flow-based (decision 104, yes branch), then function 47 determines if this is the first packet in the associated e flow (decision 110). If the packet's protocol is flow-based and this is the first packet in the flow (decision 110, yes branch), then function 47 defines a new flow with default attributes for the protocol (step 112). By way of example, the default attributes for a TCP flow can comprise byte count of zero (meaning that at this time no bytes on this flow have been analyzed), source IP address and port, destination IP address and port, protocol type, number of packets in this flow dropped equal zero (meaning that at this time no bytes of the flow have been dropped), a flag indicating that this flow is not blocked at this time, whether either of the end nodes has an intrusion analysis engine, and the customer's preference for heightened composite score/security in either end node. The default attributes for UDP can be the same as TCP. If this is a second or subsequent packet received in a flow-based message (decision 110, no branch), then function 47 fetches the flow definition associated with this packet (step 120). (The flow definition was defined in a previous iteration of decision 110 and step 112.) Next, function 47 checks the attribute values for the flow to determine if this message flow is indicated to be automatically dropped without further evaluation (step 128). For example, if a prior packet in the same flow was determined by the analysis engine 52 to be malicious (decision 126), then all of the subsequently received packets in the same flow will automatically be dropped (step 128). If so (decision 126, yes branch), then function 47 drops the packet (step 128). If not (decision 126, no branch), then function 47 determines a composite score for the packet (step 130). The composite score is based on the projected or likely benefit/cost ratio as described above.

Referring again to decision 104, no branch, where the packet's protocol is not flow-based. In such a case, function 47 proceeds directly from decision 104 to step 130 to determine the composite score for the packet, as described above.

After step 130, function 47 compares the composite score of the packet to a current threshold for composite score (step 140). If the composite score is less than the current threshold (decision 140, no branch), then function 47 does not initiate intrusion analysis of the packet, and instead updates the flow attributes for the associated message (step 142). For example, in step 142, function 47 updates the number of bytes of the message which have been received without detecting an intrusion.

Next, function 47 determines if the current rate of incoming packets is below a lower packet-rate-threshold (decision 144). Function 47 determines the current rate of incoming packets by the number of queued packets. If the current rate of incoming packets is below the lower packet-rate-threshold (decision 144, yes branch), then function 47 lowers the current threshold for the composite score (step 146). By lowering the current threshold for the composite score, statistically more subsequent packets will exceed the threshold and be analyzed by intrusion analysis engine 52. While this will slow down IPS 40, it will increase security and can be accommodated by IPS 40. Under current conditions for types of incoming packets, IPS 40 can analyze more incoming packets and still keep pace with the incoming packets. If the current rate of incoming packets is greater than or equal to the lower packet-rate-threshold (decision 144, no branch), then function 47 does not lower the current threshold for composite value. Next, function 47 passes the packet to router 50 to route the unanalyzed packet to the next hop according to the port on which the packet entered the system and the known routing protocol of the router. In the illustrated example, the next hop is subnet 70. In response, router 50 determines the next hop and forwards the unanalyzed packet to firewall 72 (or other gateway) to subnet 70. After checking the destination IP address, application identifier or other destination indicia contained in the packet's header, firewall (or other gateway) 72 forwards the packet to destination computer 60.

Refer again to decision 140, yes branch, where the composite score of the packet is greater than or equal to the current threshold for composite score. In such a case, function 47 determines if the rate of incoming packets is greater than a rate at which IPS 40 (including function 47 and intrusion analysis engine 52) can process them (decision 160). Function 47 makes this determination by counting the number of packets which have accumulated in packet cache 49 awaiting processing by function 47. If the number of accumulated packets in packet cache 49 awaiting processing is above a predetermined threshold (or if the cache 49 is filled above a predetermined percentage of its capacity) (decision 160, yes branch), then function 47 increases the threshold for the composite score (step 164). If so, statistically, function 47 will subsequently pass more packets through IPS 40 to the destination device without a time-consuming analysis by intrusion analysis engine 52. This will reduce the processing time in IPS 40 and therefore, reduce the backlog in IPS 40 and allow IPS 40 to keep up with the current rate of incoming packets. Because the composite score was found in decision 140 to be above the threshold for composite score, function 47 notifies intrusion analysis engine 52 to analyze the packet for intrusions (step 170). (Step 170 follows step 164 as well as decision 160, no branch where IPS 40 is keeping up with the rate of incoming packets and does not increase the threshold for composite score.) In response to the notification from function 47, intrusion analysis engine 52 analyzes the packet for intrusions in a known manner as described above. Next, function 47 updates the packet's flow attributes, as described above (step 142). Next, function 47 proceeds to decision 144-148, as described above.

Intrusion Prevention Management function 47, to the extent it is implemented in software, can be loaded into IPS computer 40 from a computer readable media 224 such as magnetic disk or tape, optical media, DVD, memory stick, etc. or downloaded from the Internet 30 via TCP/IP adapter card 48.

Intrusion analysis engine 52, to the extent it is implemented in software, can be loaded into IPS computer 40 from computer readable media 224 such as magnetic disk or tape, optical media, DVD, memory stick, etc. or downloaded from the Internet 30 via TCP/IP adapter card 48.

Based on the foregoing, a computer system, method and program product for intrusion prevention of a network have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A method for intrusion protection, the method comprising the steps of:
   a computer receiving a message packet en route to a destination;
   the computer determining whether to analyze the message packet to detect a malicious intrusion based at least in part on (a) a protocol of the message packet, (b) an ability of the destination to detect a malicious intrusion in the message packet, and (c) an identity of the destination;
   in response to the computer determining, based at least in part on (a), (b) and (c), to analyze the message packet to detect a malicious intrusion, the computer analyzing the message packet to detect a malicious intrusion, and
   if the analysis of the message packet indicates a malicious intrusion, the computer discarding the message packet without forwarding the message packet en route to the destination, and
   if the analysis of the message packet does not indicate a malicious intrusion, the computer forwarding the message packet en route to the destination;
   in response to the computer determining, based at least in part on (a), (b) and (c), not to analyze the message packet to detect a malicious intrusion, the computer forwarding the message packet en route to the destination without the computer analyzing the message packet to detect a malicious intrusion.

2. The method of claim 1 wherein the step of the computer determining whether to analyze the message packet to detect a malicious intrusion is based at least in part on (a) the protocol of the message packet, (b) the ability of the destination to detect a malicious intrusion in the message packet, (c) the identity of the destination, and (d) whether the message packet is encrypted such that encryption of the message packet increases a likelihood that the computer determines to analyze the message packet to detect a malicious intrusion.

3. The method of claim 1 wherein the step of the computer determining whether to analyze the message packet to detect a malicious intrusion is based at least in part on (a) the protocol of the message packet, (b) the ability of the destination to detect a malicious intrusion in the message packet, (c) the identity of the destination, and (d) whether the message packet is an acknowledgement without a payload, such that the message packet being an acknowledgement without a payload decreases a likelihood that the computer determines to analyze the message packet to detect a malicious intrusion.

4. The method of claim 1 wherein the step of the computer determining whether to analyze the message packet to detect a malicious intrusion is based at least in part on (a) the protocol of the message packet, (b) the ability of the destination to detect a malicious intrusion in the message packet, (c) the identity of the destination, and (d) whether the computer knows a current state of a message flow containing the message packet, such that the computer knowing the current state of the message flow increases a likelihood that the computer determines to analyze the message packet to detect a malicious intrusion.

5. The method of claim 1 wherein:
   the step of the computer determining whether to analyze the message packet to detect a malicious intrusion comprises the steps of:
   the computer generating a value indicating a likelihood of the message packet being a malicious intrusion, based at least in part on (a) the protocol of the message packet, (b) the ability of the destination to detect a malicious intrusion in the message packet, and (c) the identity of the destination, and
   the computer comparing the value to a predetermined threshold such that if the value exceeds the threshold, the computer determining to analyze the message packet to detect a malicious intrusion; and further comprising the subsequent steps of:
   the computer determining that the computer cannot perform the receiving, determining, analyzing, discarding and forwarding steps at a sufficient rate to keep pace with subsequent message packets that are received by the computer to determine whether to analyze the subsequent message packets to detect malicious intrusions, and in response, the computer increasing the threshold.

6. The method of claim 1 wherein:
   the step of the computer determining whether to analyze the message packet to detect a malicious intrusion is performed without the computer previously analyzing the message packet for malicious intrusions.

7. A computer program product comprising a computer-readable, tangible storage device(s) and computer-readable program instructions stored on the computer-readable, tangible storage device(s) for intrusion protection, the computer-readable program instructions, when executed by a CPU:
   receive a message packet en route to a destination;
   determine whether to analyze the message packet to detect a malicious intrusion based at least in part on (a) a protocol of the message packet, (b) an ability of the destination to detect a malicious intrusion in the message packet, and (c) an identity of the destination;
   analyze the message packet to detect a malicious intrusion, in response to the determination based at least in part on (a), (b) and (c) to detect a malicious intrusion, and
   if the analysis of the message packet indicates a malicious intrusion, discard the message packet without forwarding the message packet en route to the destination, and
   if the analysis of the message packet does not indicate a malicious intrusion, forward the message packet en route to the destination;
   forward the message packet en route to the destination without the computer analyzing the message packet to detect a malicious intrusion, in response to the determination based at least in part on (a), (b) and (c) not to analyze the message packet to detect a malicious intrusion.

8. The computer program product of claim 7 wherein the computer-readable program instructions, when executed by a CPU determine whether to analyze the message packet to detect a malicious intrusion based at least in part on (a) the protocol of the message packet, (b) the ability of the destination to detect a malicious intrusion in the message packet, (c) the identity of the destination, and (d) whether the message packet is encrypted such that encryption of the message packet increases a likelihood that the computer program instructions determine to analyze the message packet to detect a malicious intrusion.

9. The computer program product of claim 7 wherein the computer-readable program instructions, when executed by a CPU determine whether to analyze the message packet to detect a malicious intrusion based at least in part on (a) the protocol of the message packet, (b) the ability of the destination to detect a malicious intrusion in the message packet, (c) the identity of the destination, and (d) whether the message packet is an acknowledgement without a payload, such that the message packet being an acknowledgement without a payload decreases a likelihood that the computer program instructions determine to analyze the message packet to detect a malicious intrusion.

10. The computer program product of claim 7 wherein the computer-readable program instructions, when executed by a CPU determine whether to analyze the message packet to detect a malicious intrusion based at least in part on (a) the protocol of the message packet, (b) the ability of the destination to detect a malicious intrusion in the message packet, (c) the identity of the destination, and (d) whether the computer program instructions knows a current state of a message flow containing the message packet, such that the computer program instructions knowing the current state of the message flow increases a likelihood that the computer program instructions determine to analyze the message packet to detect a malicious intrusion.

11. The computer program product of claim 7 wherein the computer-readable program instructions, when executed by a CPU determine whether to analyze the message packet to detect a malicious intrusion by:
generating a value indicating a likelihood of the message packet being a malicious intrusion, based at least in part on (a) the protocol of the message packet, (b) the ability of the destination to detect a malicious intrusion in the message packet, and (c) the identity of the destination, and
comparing the value to a predetermined threshold such that if the value exceeds the threshold, the computer determining to analyze the message packet to detect a malicious intrusion; and wherein
the computer-readable program instructions, when executed by a CPU also determine that the computer program product cannot perform the receiving, determining, analyzing, discarding and forwarding at a sufficient rate to keep pace with subsequent message packets that are received by the computer-readable program instructions to determine whether to analyze the subsequent message packets to detect malicious intrusions, and in response, increase the threshold.

12. The computer program product of claim 7 wherein the computer-readable program instructions, when executed by a CPU determine whether to analyze the message packet to detect a malicious intrusion without previously analyzing the message packet for malicious intrusions.

13. A computer system for intrusion protection, the computer system comprising:
a computer-readable, tangible storage device(s), a CPU and a computer-readable memory;
program instructions, stored on the storage device for execution by the CPU via the memory, to receive a message packet en route to a destination;
program instructions, stored on the storage device for execution by the CPU via the memory, to determine whether to analyze the message packet to detect a malicious intrusion based at least in part on (a) a protocol of the message packet, (b) an ability of the destination to detect a malicious intrusion in the message packet, and (c) an identity of the destination;
program instructions, stored on the storage device for execution by the CPU via the memory, to analyze the message packet to detect a malicious intrusion, in response to the determination based at least in part on (a), (b) and (c) to detect a malicious intrusion, and
if the analysis of the message packet indicates a malicious intrusion, discard the message packet without forwarding the message packet en route to the destination, and
if the analysis of the message packet does not indicate a malicious intrusion, forward the message packet en route to the destination;
program instructions, stored on the storage device for execution by the CPU via the memory, to forward the message packet en route to the destination without the computer analyzing the message packet to detect a malicious intrusion, in response to the determination based at least in part on (a), (b) and (c) not to analyze the message packet to detect a malicious intrusion.

14. The computer system of claim 13 wherein the program instructions to determine whether to analyze the message packet to detect a malicious intrusion determine whether to analyze the message packet to detect a malicious intrusion based at least in part on (a) the protocol of the message packet, (b) the ability of the destination to detect a malicious intrusion in the message packet, (c) the identity of the destination, and (d) whether the message packet is encrypted such that encryption of the message packet increases a likelihood of determining to analyze the message packet to detect a malicious intrusion.

15. The computer system of claim 13 wherein the program instructions to determine whether to analyze the message packet to detect a malicious intrusion determine whether to analyze the message packet to detect a malicious intrusion based at least in part on (a) the protocol of the message packet, (b) the ability of the destination to detect a malicious intrusion in the message packet, (c) the identity of the destination, and (d) whether the message packet is an acknowledgement without a payload, such that the message packet being an acknowledgement without a payload decreases a likelihood of determining to analyze the message packet to detect a malicious intrusion.

16. The computer system of claim 13 wherein the program instructions to determine whether to analyze the message packet to detect a malicious intrusion determine whether to analyze the message packet to detect a malicious intrusion based at least in part on (a) the protocol of the message packet, (b) the ability of the destination to detect a malicious intrusion in the message packet, (c) the identity of the destination, and (d) whether the computer program instructions knows a current state of a message flow containing the message packet, such that the program instructions knowing the current state of the message flow increases a likelihood of determining to analyze the message packet to detect a malicious intrusion.

17. The computer system of claim 13 wherein the program instructions to determine whether to analyze the message packet to detect a malicious intrusion determine whether to analyze the message packet to detect a malicious intrusion by:
   generating a value indicating a likelihood of the message packet being a malicious intrusion, based at least in part on (a) the protocol of the message packet, (b) the ability of the destination to detect a malicious intrusion in the message packet, and (c) the identity of the destination, and
   comparing the value to a predetermined threshold such that if the value exceeds the threshold, the computer determining to analyze the message packet to detect a malicious intrusion; and further comprising
program instructions, stored on the storage device for execution by the CPU via the memory, to determine that the program instructions cannot perform the receiving, determining, analyzing, discarding and forwarding at a sufficient rate to keep pace with subsequent message packets that are received by the program instructions to determine whether to analyze the subsequent message packets to detect malicious intrusions, and in response, increase the threshold.

18. The computer system of claim 13 wherein the program instructions to determine whether to analyze the message packet to detect a malicious intrusion determine whether to analyze the message packet to detect a malicious intrusion without a computer which executes the computer program product previously analyzing the message packet for malicious intrusions.

* * * * *